US009922340B1

(12) United States Patent
Vaver et al.

(10) Patent No.: US 9,922,340 B1
(45) Date of Patent: Mar. 20, 2018

(54) EVALUATING ATTRIBUTION MODELS BASED ON SIMULATED ACTIVITY STREAMS

(71) Applicant: Google Inc., Mountain View, CA (US)

(72) Inventors: Jon Vaver, Lafayette, CO (US); Stefan F. Schnabl, San Francisco, CA (US)

(73) Assignee: Google LLC, Mountain View, CA (US)

( * ) Notice: Subject to any disclaimer, the term of this patent is extended or adjusted under 35 U.S.C. 154(b) by 555 days.

(21) Appl. No.: 14/250,016

(22) Filed: Apr. 10, 2014

(51) Int. Cl.
*G06Q 30/00* (2012.01)
*G06Q 30/02* (2012.01)

(52) U.S. Cl.
CPC ............................ *G06Q 30/0242* (2013.01)

(58) Field of Classification Search
CPC .................................................. G06Q 30/0242
USPC ...................................................... 705/14.41
See application file for complete search history.

(56) References Cited

U.S. PATENT DOCUMENTS

| | | | | |
|---|---|---|---|---|
| 7,831,472 | B2 * | 11/2010 | Yufik | G06Q 30/02 705/14.4 |
| 8,321,273 | B2 | 11/2012 | Briggs | |
| 8,621,068 | B2 | 12/2013 | Zohar et al. | |
| 8,768,770 | B2 * | 7/2014 | Kitts | G06Q 30/0242 705/14.52 |
| 9,183,562 | B2 * | 11/2015 | Chittilappilly | G06Q 30/02 |

OTHER PUBLICATIONS

Microsoft Computer Dictionary, Fifth Edition, 2002, Microsoft Press, p. 23.*
Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*
Computing the Mind, Shimon Edelman, Oxford University Press, 2008, pp. 26-31.*

(Continued)

*Primary Examiner* — David J Stoltenberg
*Assistant Examiner* — Michael I Ezewoko
(74) *Attorney, Agent, or Firm* — Fish & Richardson P.C.

(57) ABSTRACT

Methods, systems, and apparatus including computer programs encoded on computer-readable storage media are provided for evaluating an attribution model, based on simulated activity streams. Parameters are specified that describe how users behave in the absence and presence of advertising, and parameters that regulate advertising in a simulation. A first set of simulated activity streams is generated with advertising turned on, observational metrics associated with the first set of streams are determined, and an attribution model is applied to determine a first fraction of incremental conversions associated with one or more advertising channels. Further sets of simulated activity streams are generated, each with a single advertising channel turned off, observational metrics associated with the further sets of streams are determined, and a second fraction of incremental conversions is determined for each advertising channel. The first and second fractions of incremental conversions are compared to evaluate the attribution model.

20 Claims, 8 Drawing Sheets

(56) References Cited

OTHER PUBLICATIONS

Noetics, Lawrence Krader, 2010, Peter Lang Publishing, pp. 551-553.*
Britannica Concise Encyclopedia, Encyclopedia Britannica, 2006, p. 537.*
Havas Media Group, "Cross Media Attribution," May 2012, 25 pages.
Google Analytics Blog [online]. "Data-Driven Attribution: better investment decisions, better marketing outcomes," Aug. 20, 2013 [retrieved on Mar. 6, 2014]. Retrieved from the internet: URL<http://analytics.blogspot.com/2013/08/data-driven-attribution-better.html>, 5 pages.
Owen, "Testing data driven attribution models," Google Inc., Sep. 2013, 4 pages.
Johnston et al., "Strategic Online Advertising: Modeling Internet User Behavior with Advertising.com," Apr. 14, 2006, 6 pages.
Norwood, "Validating Attribution Models," MediaPost Blogs, May 31, 2012 [retrieved on Mar. 6, 2014]. Retrieved from the internet: URL:<http://www.mediapost.com/publications/article/175901/validating-attribution-models.html>, 4 pages.
Chandler-Pepelnjak, "Modeling Conversions in Online Advertising," student paper, University of Montana, May 2010, 167 pages.
Scott et al., "A Nested Hidden Markov Model for Internet Browsing Behavior," Student paper, University of Southern California, Marshall School of Business, Dec. 1, 2006, 26 pages.

\* cited by examiner

400

|      | BS | GS | VTA | VTNA | VW | C | EOS |
|------|----|----|-----|------|----|----|-----|
| BS   | b  | d  | e*  | f    | 0  | 0  | a   |
| GS   | b  | d  | e   | f    | 0  | 0  | a   |
| VTA  | b  | d  | e*  | f    | g  | c  | a   |
| VTNA | b  | d  | e   | f    | g  | 0  | a   |
| VW   | b  | d  | e   | f    | g  | 0  | a   |
| C    | b  | d  | e   | f    | 0  | 0  | a   |
| EOS  | 0  | 0  | 0   | 0    | 0  | 0  | 1   |

| Format | BS | GS | VTA | Transition Matrix Impact |
|--------|----|----|-----|--------------------------|
| search-long  | h | 1 | j | persistent |
| search-short | z | 1 | z | temporary  |
| display      | k | k | k | persistent |
| video        | l | l | l | persistent |

| Format | Burn-in / Fatigue Parameter ($n\_o$) |
|---|---|
| search | 0 |
| display | x |
| video | y |

| Format | Impressibility Threshold | Share of Voice | Base Cost | Cost Scaling Indicator |
|---|---|---|---|---|
| search | m | p | s | 1 |
| display | n | q | t | 0 |
| video | o | r | u | 0 |

| Format | Frequency Cap |
|---|---|
| search | ∞ |
| display | v |
| video | w |

FIG. 4E

EVALUATING ATTRIBUTION MODELS BASED ON SIMULATED ACTIVITY STREAMS

BACKGROUND

The present specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with the web page, for example, along with search results. After viewing such content, for example, a content consumer may perform various actions, such as interacting with (e.g., clicking) a content item, navigating to a content provider's (e.g., an advertiser's) web site, and/or purchasing a product or service from the content provider. The behavior of content consumers may be simulated to model online activity and purchasing patterns.

Attribution modeling can be used to attribute the actions of content consumers to content items to which the consumers have previously been exposed. In general, attribution models are correlational, and may include position and/or rules-based techniques for attribution. The estimated value (e.g., return on advertising spend) of a campaign (e.g., a marketing campaign) calculated using an attribution model may vary, depending on the type of attribution model used.

SUMMARY

In general, one innovative aspect of the subject matter described in this specification can be embodied in methods for evaluating an effectiveness or applicability of an attribution model for a campaign that include the actions of specifying parameters that describe how users behave in an absence of advertising, parameters that describe how users react to advertising, and parameters that regulate injection of advertising in a simulation; generating, by one or more processors, a first set of simulated activity streams with advertising turned on, based on the specified parameters; determining observational metrics associated with the first set of simulated activity streams; applying an attribution model to the generated first set of simulated activity streams and determining a first fraction of incremental conversions associated with one or more advertising channels; generating, by one or more processors, one or more further sets of simulated activity streams, each with a single advertising channel turned off, based on the specified parameters; determining observational metrics associated with the one or more further sets of simulated activity streams; determining a second fraction of incremental conversions for each advertising channel by evaluating the further set of simulated activity streams with the single advertising channel turned off; and comparing the first and second fractions of incremental conversions to determine the applicability of the attribution model. Other embodiments of this aspect can include corresponding systems, apparatus, and computer programs, configured to perform the actions of the methods, encoded on computer storage devices.

These and other implementations can each optionally include one or more of the following features. Specifying parameters that describe how users behave in an absence of advertising can include one or more of specifying an activity level that influences a length of a simulated activity stream, an activity preference from among a plurality of possible activities, or a conversion rate for a given activity. Specifying parameters that describe how users behave in an absence of advertising can include generating a transition matrix that includes columns and rows that represent activities and corresponding entries in the transition matrix that define a probability of progressing from a given activity to a corresponding next activity. Specifying parameters that describe how users react to advertising can include specifying a probability that a user's behavior will change with advertising exposure and a modification to the transition matrix based on exposure to a given advertisement. Specifying parameters that regulate injection of advertising in a simulation can include specifying one or more of a probability that an advertisement is served in a respective channel of the campaign, a budget cap per channel, a minimum threshold for impressibility for each channel, or a cost of advertising per channel. Generating the first set of simulated activity streams can include for a first stream, identifying a starting point on the transition matrix that corresponds with an initial activity, traversing the transition matrix in accordance with defined probabilities, impressing advertising from the channels in accordance with a probability that an advertisement will be served in association with a respective activity, adjusting the transition matrix in accordance with the modification, and continuing to generate the first stream until an end of session activity is determined. Determining observational metrics associated with the first set of simulated activity streams can include, for each type of advertising channel, determining one or more of impressions, clicks, spend, reach, frequency, or share. Applying the attribution model can include determining an estimate of a number of conversions associated with each advertising channel. Determining the first fraction of incremental conversions associated with one or more advertising channels can include calculating an estimated fraction of incremental conversions for each of the channels. Generating the one or more further sets of simulated activity streams can include, for a first stream, identifying a starting point on the transition matrix that corresponds with an initial activity, traversing the transition matrix in accordance with defined probabilities, and continuing to generate the first stream until an end of session activity is determined. Determining observational metrics associated with the one or more further sets of simulated activity streams can include, for each type of advertising channel, determining one or more of impressions, clicks, or share. Determining the second fraction of incremental conversions for each advertising channel can include determining a number of incremental conversions for the single advertising channel, repeating the generating and determining for each advertising channel, calculating a total number of incremental conversions for each advertising channel, and determining the second fraction of incremental conversions for each advertising channel based on a respective number of incremental conversions for a given channel divided by the total number of incremental conversions. Total spend can be used as a budget, an optimal mix of spend can be determined across all advertising channels that generates a most incremental conversions using the budget, observational metrics can be generated in association with the optimal mix, a fraction of incremental spend can be found and assigned to each channel, and applicability of the attribution model can be determined, including comparing the fraction of incremental spend with the first fraction of incremental conversions. One or more of the further sets of simulated activity streams can have multiple advertising channels turned off, based on the specified parameters. The actions of the method can be repeated for a second attribution model and results can be compared for each attribution model to determine a most effective attribution model. The parameters can be varied and the actions of the method can be repeated to evaluate the attribution model in view of the varied parameters.

Advantageous implementations may include none, one or more of the following features. By running campaign simulations, content providers (e.g., advertisers) can readily explore various scenarios for providing content items (e.g., advertisements) associated with a campaign. Attribution models can be evaluated under many different assumptions about how and to what extent distribution and different types of content or serving parameters may impact user behavior. Attribution models can be compared, and the conditions for the applicability of any particular attribution model may be identified. Content providers can perform comparisons of standard or custom attribution models by varying simulation parameters. Quantitative guidance can be provided to content sponsors for use in selecting an attribution model for a particular type of campaign.

The details of one or more implementations are set forth in the accompanying drawings and the description below. Other potential features and advantages will become apparent from the description, the drawings, and the claims.

BRIEF DESCRIPTION OF THE DRAWINGS

FIG. 4A is an example of an activity transition matrix.

FIG. 4B is an example of activity transition matrix scaling parameters.

FIG. 4C is an example of content impact scaling parameters.

FIG. 4D is an example of content serving parameters.

FIG. 4E is an example of content frequency cap parameters.

Like reference numbers and designations in the various drawings indicate like elements.

DETAILED DESCRIPTION

Figure 1:
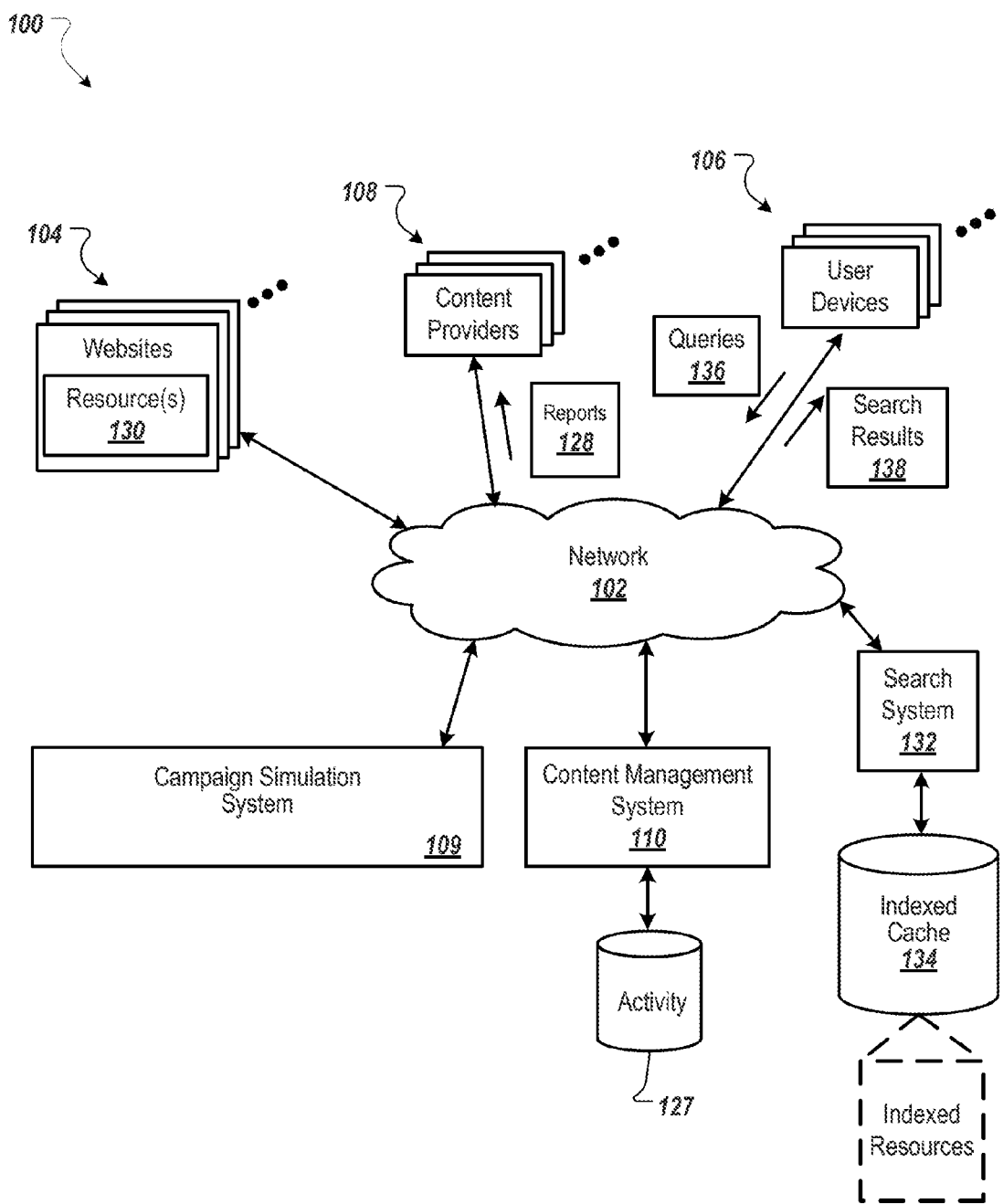
FIG. 1 is a block diagram of an example environment for presenting content to users in response to requests for content and for performing campaign simulations.

Attribution models can be used to attribute user actions, interactions, conversions (e.g., a click of a content item, a visit to a web site, a subscription to a mailing list, a following on a social networking site, or a purchase of a product or service.) or other activities to one or more content items (e.g., display, search, or video content) to which the users have previously been exposed in association with a campaign. For example, the campaign (e.g., a marketing campaign) may include one or more channels (e.g., advertising channels) for presenting content items to users, and parameters (e.g., time, location, or bid amount) for presenting the content items. In general, attribution models are correlational, and may be used to calculate an estimate of the proportion of conversions that may be attributed to each channel of a campaign, and an estimated value (e.g., return on advertising spend or cost per action) of the user actions performed during or in association with the campaign. The calculated estimates may vary, however, depending on the type of model used.

Campaign simulations can be conducted to generate simulated activity streams that represent the online actions (e.g., searches, visits to websites, video views, or conversions) of users. For example, an activity transition matrix may be used in association with various simulation parameters to describe/determine a progression of a virtual user from one activity to the next during a simulated web session. When performing the simulations, for example, a virtual experiment may be conducted by turning on or off one or more distribution channels (e.g., advertising distribution channels) to simulate the presence or absence of a particular channel. An attribution model can be applied to a set of simulated activity streams with the channels turned on to identify estimated conversions associated with each of the channels, as determined by the attribution model. The set of simulated activity streams with the channels turned on can be compared to one or more sets of simulated activity streams with one or more channels turned off to identify causal results of the virtual experiment in regard to the effectiveness of each channel. The estimated conversions identified using the attribution model can be compared with the causal results of the virtual experiment to determine the applicability of the attribution model for a campaign. Comparison information can be presented to a campaign sponsor to provide guidance for selecting a suitable attribution model for use in identifying campaign performance.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content management system that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content management system.

FIG. 1 is a block diagram of an example environment 100 for presenting content to users in response to requests for content and for performing campaign simulations. The example environment 100 includes a network 102, such as a local area network (LAN), a wide area network (WAN), the Internet, or a combination thereof. The network 102 connects websites 104, user devices 106, content providers 108, publishers, a campaign simulation system 109, and a content management system 110. The example environment 100 may include many thousands of websites 104, user devices 106, and content providers 108. The content providers 108 can be, for example, advertisers. Other types of content providers are possible.

The campaign simulation system 109 can be used to design and perform a series of campaign simulations and analyze the results of those simulations. A simulation tests a campaign, for example, by modeling the behavior of content consumers and content providers, and running various virtual experiments based on the modeled behavior. In general, the simulations are performed by simulating subject behavior to determine what effect, if any, a change in a campaign parameter (such as spend) has on the behavior. Spend, for example, may be controlled by a change in bid amount (which can change share of voice), and/or a change in a keyword set (which can change audience impressibility). A return on campaign spend can be determined based on a simulation, for example, which can reflect an incremental change in user behavior per campaign dollar spent.

The campaign simulation system 109 can be implemented as one or more software programs executing on one or more computers/servers. While the campaign experiment system 109 is illustrated as a single system in FIG. 1, individual components of the campaign experiment system 109 can alternatively be divided among multiple systems.

In general, observations and analysis based on a campaign simulation can be reported, such as in one or more reports 128 provided to content providers 108 (e.g., campaign sponsors). For example, in addition to or instead of reporting campaign effectiveness based on one or more simulations, one or more attribution models (e.g., first click, last click, data-driven, etc.) can be applied to data from the simulations to provide campaign effectiveness estimates based on the attribution models. As described in more detail below, reporting can include determining and providing (e.g., to a campaign sponsor) one or more comparisons between campaign effectiveness as determined by a simulation, and campaign effectiveness estimates based on one or more attribution models. Based on the reports 128, for example, content providers 108 can determine an applicability of a particular attribution model for estimating the effectiveness of a particular campaign or group of campaigns.

The content management system 110 may be used for selecting and providing content in response to requests for content. Below is a description of the content management system 110 and related components in a context of online content presentation (e.g., online advertising). However, other types of content presentation can be used, such as presentation of content on television, radio, print, or billboards, to name a few examples.

A website 104 includes one or more resources 130 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 130 can be any data that can be provided over the network 102. A resource 130 can be identified by a resource address that is associated with the resource 130. Resources 130 include HTML pages, word processing documents, portable document format (PDF) documents, images, video, and news feed sources, to name only a few. The resources 130 can include content, such as words, phrases, videos, images and sounds, that may include embedded information (such as meta-information hyperlinks) and/or embedded instructions (such as scripts).

To facilitate searching of resources 130, the environment 100 can include a search system 132 that identifies the resources 130 by crawling and indexing the resources 130 provided by the content publishers on the websites 104. Data about the resources 130 can be indexed based on the resource 130 to which the data corresponds. The indexed and, optionally, cached copies of the resources 130 can be stored in an indexed cache 134.

A user device 106 is an electronic device that is under control of a user and is capable of requesting and receiving resources 130 over the network 102. Example user devices 106 include personal computers, tablet computers, mobile communication devices (e.g., smartphones), televisions, and other devices that can send and receive data over the network 102. A user device 106 typically includes one or more user applications, such as a web browser, to facilitate the sending and receiving of data over the network 102. The web browser can display various types of web applications, such as a map application.

A user device 106 can, for example, request resources 130 from a website 104. In turn, data representing the resource 130 can be provided to the user device 106 for presentation by the user device 106. As another example, user devices 106 can submit search queries 136 to the search system 113 over the network 102. In response to a search query 136, the search system 113 can access the indexed cache 134 to identify resources 130 that are relevant to the search query 136. The search system 113 identifies the resources 130 in the form of search results 138 and returns the search results 138 to the user devices 106 in one or more search results pages.

A request for content can be received by the content management system 110 from a user device 106. The request for content can be associated with, for example, a request for a resource 130 or a search query 136. The content management system 110 can select one or more additional content items to provide in response to the request. For example, the request for content can include characteristics (e.g., size, supported media types) of one or more content "slots" that are defined for the requested resource 130 or search results page. As another example, resource keywords associated with a requested resource 130 or a search query 136 can be provided to the content management system 110.

Content items selected by the content management system 110 can include content items having characteristics matching the characteristics of content slots and that are identified as relevant to specified resource keywords or search queries 136. For example, content items having keywords that match the resource keywords or the search query 136 can be selected by the content management system 110. The content management system 110 can also select content items at least in part based on the results of an auction. Data indicating user responses (e.g., click-throughs, conversions, etc.) to content items can be stored in the activity data store 127.

Figure 2:
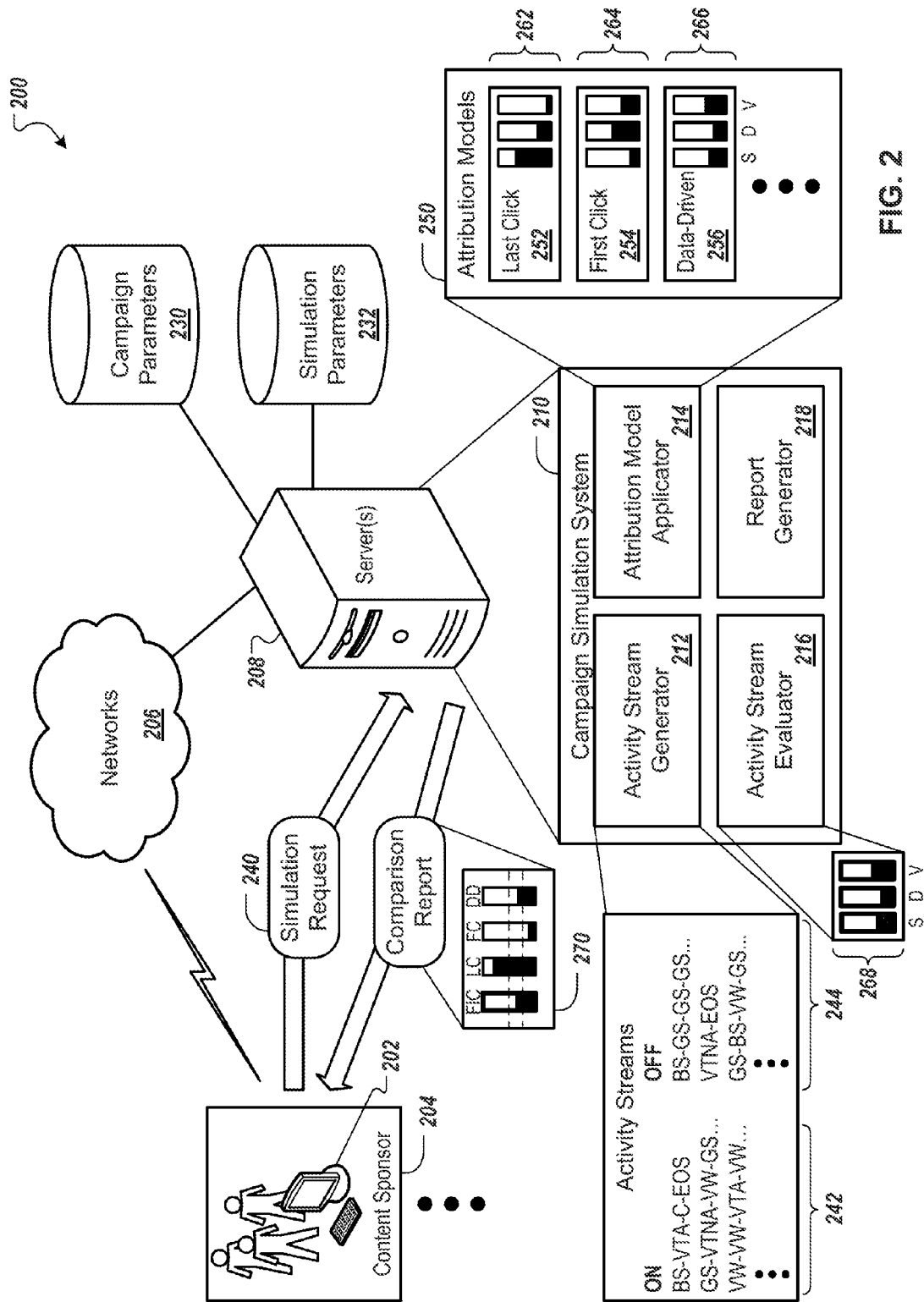
FIG. 2 is a diagram of an example system for performing campaign simulations and evaluating attribution models based on simulated activity streams.

FIG. 2 is a diagram of an example system 200 for performing campaign simulations and evaluating attribution models based on simulated activity streams. The system 200 can include one or more client devices 202 (each operated by a corresponding content sponsor 204) that communicate over one or more networks 206 with one or more computing servers 208.

The networks 206 may include a wireless cellular network, a wireless local area network (WLAN) or WiFi network, a Third Generation (3G) or Fourth Generation (4G)

mobile telecommunications network, an intranet, the Internet, or any other suitable network or any appropriate combination thereof.

The client device(s) 202 may be any suitable type of computing device (e.g., mobile phone, smartphone, personal digital assistant, tablet computer, laptop or desktop computer, or other stationary or portable device) that includes one or more processors and computer readable media. Among other components, for example, the client device(s) 202 includes one or more processors, computer readable media that store software applications, input device(s) (e.g., touch screens, keyboards, computer mice, motion sensors, microphones, etc.), output device(s) (e.g., display screens, speakers, etc.), and communications interfaces.

The computing server(s) 208 may be configured to execute application code associated with a variety of software components (e.g., modules, objects, libraries, or services), including computer instructions to perform some or all of the method steps described below. In some implementations, the computing server(s) 208 may include one or more components of campaign simulation system 210 (e.g., similar to the campaign simulation system 109, shown in FIG. 1).

The campaign simulation system 210 can generate sets of simulated activity streams with content distribution turned on or off, can apply various attribution models to the activity streams, can evaluate the activity streams, and can compare the effectiveness of a distribution channel as estimated by an attribution model with the effectiveness of the distribution channel as determined by the results of a simulation (i.e., a virtual experiment). In the present example, the campaign simulation system 210 includes an activity stream generator 212, an attribution model applicator 214, an activity stream evaluator 216, and a report generator 218. Two or more of the components 212, 214, 216, and 218 may be implemented on the same device (e.g., same computing device), or on different devices, such as devices included in a server farm or a peer-to-peer network.

The campaign simulation system 210 can be in communication with one or more data stores, servers, and/or other systems. In the present example, the attribution model evaluation system 210 can communicate with a campaign parameter data store 230 and a simulation parameters data store 232, each of which can include databases, file systems, and other suitable mechanisms for adding, removing, and maintaining data used by the system 200.

A more detailed description of the operation of the example system 200 of FIG. 2 and its various components is provided below with reference to FIG. 5.

Figure 3:
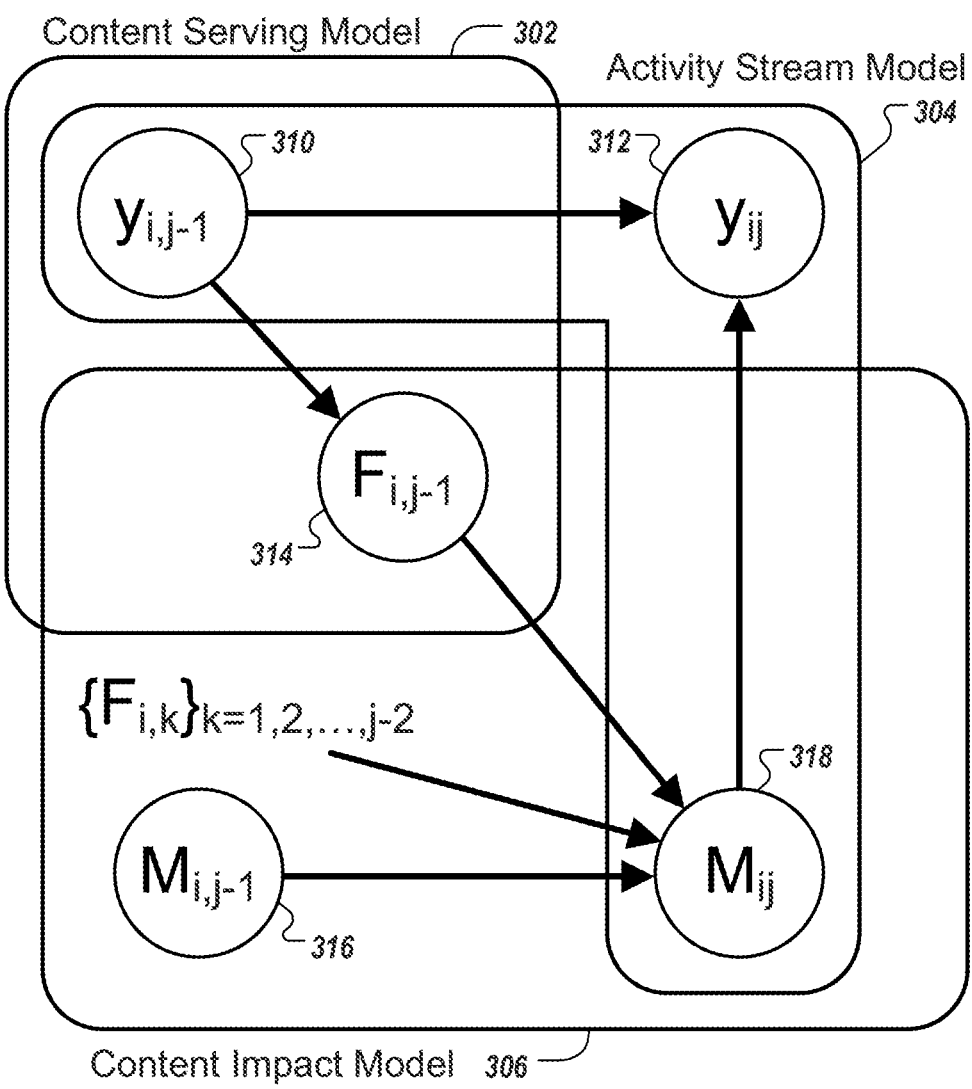
FIG. 3 is an example of a graphical model for simulating activity streams.

FIG. 3 shows a graphic example of a model 300 for simulating activity streams. The model 300 (e.g., an extended hidden Markov model) includes a content serving model 302, an activity stream model 304, and a content impact model 306. The model 300 can be used by the campaign simulation system 210 (shown in FIG. 2), for example, to generate simulated user-level activity streams, which may be used to evaluate the effectiveness of different distribution channels (e.g., channels for presenting search ads, display ads, and/or video ads) in a campaign (e.g., a marketing campaign that may include one or more advertisements for presentation to users over a timeframe).

Referring to the model 300, for example, various model states (e.g., states 310, 312, 314, 316, and 318) are shown. State 312 ($y_{ij}$) refers to an observed state describing a user's activities. The value O, for example, represents a value space for each $y_{ij}$, and N[O] represents a total number of values that y can be associated with. State 314 ($F_{i,j-1}$) refers to a serving state indicating which format of content has been served to a user. The value K, for example, represents a format space and N[K] represents a number of available content item formats. State 318 ($M_{ij}$) refers to a transition matrix for moving from state 310 ($y_{i,j-1}$) to state 312 ($y_{ij}$).

In general, the model 300 may include various features. User-level activity streams may be varied in content, exposure, and length. By changing values in the states space for the activity stream model 304, for example, content and exposure can be modified. Length can be controlled by transition matrices in the activity stream model 304, for example. User-level activity may reflect user heterogeneity and behavior changes with or without the impact of content items (e.g., advertisements). For example, the content impact model 306 can be used to reflect user heterogeneity and how user behavior would change given all content that has been presented to users. Content exposure may impact a particular user's downstream activity, and this impact may vary by format. For example, the content impact model 306 can be used to determine how each content item format would impact the user's downstream activity. Content serving (e.g., ad serving) may be turned on or off, which may enable the impact of content on user behavior to be measured with a virtual experiment. During the experiment, for example, a level of content serving may be modified, and may vary by format. For example, an amount of search advertising may be increased while decreasing an amount of display advertising (or vise-versa) in a campaign. Content serving, for example, can be controlled by the content serving model 302.

To configure the model 300, for example, various observable states can be defined, which correspond to possible actions that may be performed by a user. In the present example, the observable states for state 312 can include brand search (BS), generic search (GS), site visits to a content sponsor's (e.g., an advertiser's) website (VTA), site visits to other websites (VTNA), video watching (VW), conversion (C), and end of session (EOS).

Various possible formats for content items (e.g., advertisements) may be used. In the present example, search ads, display ads, and video ads are possible format types for content items to be presented to users. Other formats are possible including those that depend on the type of content being delivered. Search ads, for example, may be served after brand search (BS) or generic search (GS) activities. Display ads, for example, may be served after a visit to a non-advertiser website (VTNA). Video ads, for example, may be served after (or during) a video is presented to a user (VW).

The content serving model 302, for example, can be used to represent a share of voice of each channel (e.g., advertising channel) in a campaign of a content provider (e.g., an advertiser). In some implementations, the content serving model 302 may be expressed as:

$$P(F_{ij} \mid y_{ij}, IMP_i) = \sum_{f \in F} 1(imp_{if} > \partial_f) P(F_{ij} = f \mid y_{ij})$$

where F={display ads, search ads, video ads}
and where $IMP_i = \{imp_{if}\}_{f \in F}$,
and where $y_{ij} \in O$ In the content serving model 302, for example, the IMP component can represent an impressibility level for each user, the delta component can represent an impressibility threshold for each campaign, and P(f|y) can define a share of voice of the campaign. For a baseline model (i.e., a model for a control group), for example, delta and P(fly) can be zero.

In the present example, as some content items (e.g., advertisements) may be presented under particular circumstances, A(C,F) may be defined as the probability that a content item with format F will be shown after activity C, yielding P(fly), which follows the structure:

$$A = \begin{bmatrix} & \text{video ads} & \text{search ads} & \text{display ads} \\ BS & 0 & \pi_s BS & 0 \\ GS & 0 & \pi_s GS & 0 \\ VW & \pi_v VW & 0 & \pi_d VW \\ VTNA & 0 & 0 & \pi_d VTNA \\ VTA & 0 & 0 & 0 \\ C & 0 & 0 & 0 \end{bmatrix}$$

The content impact model 306, for example, may be used to represent changes in a user's behavior (e.g., downstream activity) after exposure to a content item (e.g., an advertisement). In some implementations, the content impact model may expressed as:

$$P(M_{ij} | M_{i,j-1}, \{F_{i,k}\}_{k=1}^{j-1}) = \\ (1 - \alpha_{F_{i,j-1}})1(M_{ij} = M_{i,j-1}) + \alpha_{F_{i,j-1}}1(M_{ij} = M[\{F_{i,k}\}_{k=1}^{j-1}])$$

where $M[x]=\{M_{ij}[x]\}$ is a $N[O] \times N[O]$ matrix with each element $M_{ij}[x]$ being a function of x. The parameter $\alpha$, for example, can reflect the probability that a user's downstream activity may change after a particular exposure to a particular content item. In some implementations, user heterogeneity may be introduced into a simulation by varying a value of $\alpha$ to represent a different impressibility for different users. For example, $\alpha_{if} \sim \text{Beta}(a_f, b_f)$, where $\alpha_{if}$ indicates user i's tolerance to ad format $f$. The function M[x], for example, can reflect the effectiveness of multiple content item exposures and how a user's behavior may change with respect to all the content items the user was exposed to.

The observable states for state 312, for example, may be defined as O={BS, GS, VTA, VTNA, VW, C, EOS}. In some implementations, a model for the observable states for state 312 may be expressed as:

$$P(y_{ij}|y_{i,j-1},M_{ij})=M_{ij}(y_{i,j-1},y_{ij})$$

where $M_{ij}$ is an O×O activity transition matrix with its element M(x, y) indicating the probability of moving from state x, and y being any of the values in O.

FIGS. 4A-E show respective examples of an activity transition matrix 400, activity transition matrix scaling parameters 402, content impact scaling parameters 404, content serving parameters 406, and content frequency cap parameters 408. In some implementations, the activity transition matrix 400 and associated parameters 402, 404, 406, and 408 may be based on historical aggregated user activity data (e.g., data maintained by the activity data store 127, shown in FIG. 1) and/or may be based on theoretical models of user behavior. A description of the activity transition matrix 400 and associated parameters 402, 404, 406, and 408 is provided below with reference to FIG. 5.

Figure 5:
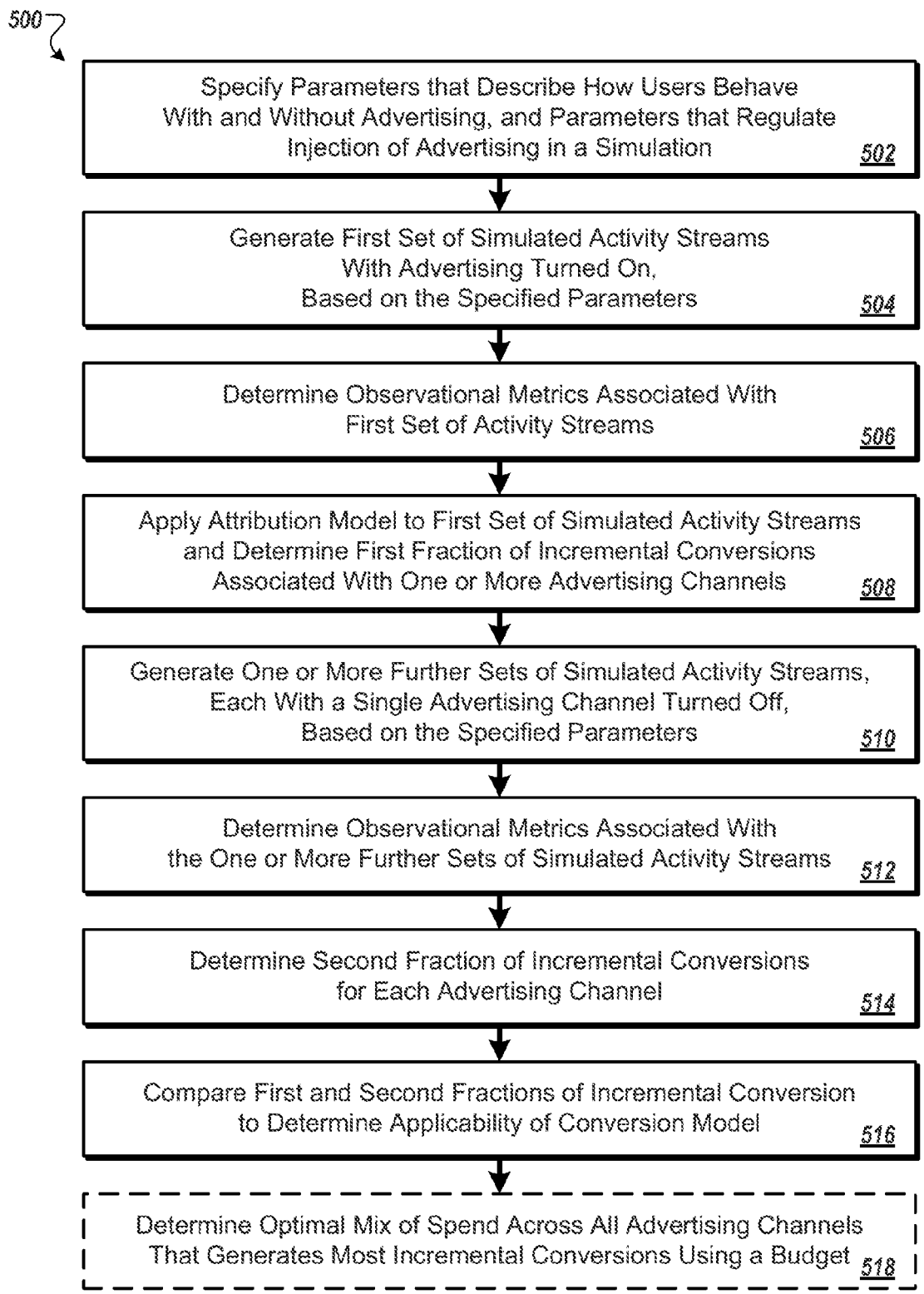
FIG. 5 is a flow chart illustrating an example process for evaluating attribution models based on simulated activity streams.

With respect to FIG. 5, an example process 500 is described for evaluating attribution models based on simulated activity streams. The process 500 can be performed, for example, by data processing apparatus such as the campaign simulation system 109 (shown in FIG. 1) or the campaign simulation system 210 (shown in FIG. 2), and can be used to evaluate an effectiveness or applicability of an attribution model for a campaign.

Before initiating the process 500, for example, the campaign simulation 210 may receive a simulation request 240 from the content sponsor 204 (e.g., an advertiser) via the client device 202 and the networks 206. For example, the simulation request 240 can include an identifier for a campaign for presenting content to users. The campaign simulation system 210 can use the identifier to reference the campaign parameters data store 230, and can identify a corresponding campaign including one or more distribution channels for presenting content (e.g., creative associated with the campaign) to users, campaign budget data (e.g., spend values and/or bids for each channel), general profile information for an intended audience for the campaign, and other relevant data. In some implementations, the simulation request 240 may include parameter specifications for performing a campaign simulation, and/or may include identifiers for one or more attribution models to be compared with the results of the simulation.

Parameters are specified (502) for a campaign simulation, including parameters that describe how users behave in an absence of receiving content associated with the campaign, parameters that describe how users react to received content, and parameters that regulate injection of content items in a simulation. To identify a set of campaign simulation parameters, for example, the campaign simulation system 210 can reference the simulation parameters data store 232 and/or can base the parameters at least in part on data specified in the simulation request 240.

In some implementations, specifying parameters that describe how users behave in an absence of content may include one or more of specifying an activity level that influences a length of a simulated activity stream, an activity preference from among a plurality of possible activities, or a conversion rate for a given activity. The activity level, for example, may represent a volume of user activity over a predetermined time interval (e.g., a day, a week, a month). A campaign simulation may include a heterogeneous set of users, for example, and different users (or types of users) may be associated with different activity levels. Activity preferences may vary per user or user type, and may specify the relative frequency of a particular activity for a user. For example, some users may have a high probability of performing searches, watching videos, or some other activity, relative to other users. A conversion rate, for example, may represent an organic conversion rate, or a baseline engagement with a content sponsor (e.g., an advertiser). For example, in the absence of advertising, a baseline percentage of users may connect and convert with the advertiser.

In some implementations, specifying parameters that describe how users behave in an absence of content may include generating a transition matrix that includes columns and rows that represent activities and corresponding entries in the transition matrix that define a probability of progressing from a given activity to a corresponding next activity. For example, the campaign simulation system 210 can generate the activity transition matrix 400 (shown in FIG. 4A). The various activities, e.g., branded search (BS), generic search (GS), visit to an advertiser's website (VTA), visit to a website that does not belong to the advertiser (VTNA), video view (VW), conversion (C), and end of session (EOS) included in the activity transition matrix 400, for example, correspond with the observable states for state 312 of the model 300 (shown in FIG. 3) for simulating activity streams. As shown in the activity transition matrix 400, for example, an activity level a∈(0, 1), a conversion rate c∈(0, 1), and activity preferences b, d, e, f, g∈(0, 1) can be specified. In the present example, a conversion may occur after a visit to an advertiser's website (VTA), defined by the conversion rate c (e.g., a fixed value). After parameter specification, for example, the rows of the activity transition matrix 400 can be normalized, e.g., so that the values of the rows sum to one.

In some implementations, scaling parameters may be used to modify a probability of a particular activity transitioning into another activity. For example, a probability of a branded search (BS) activity transitioning into a visit to an advertiser's website (VTA), a probability of a visit to an advertiser's website (VTA) transitioning into another visit (VTA), or a probability of another sequence of transitions occurring may be positively or negatively adjusted.

In some implementations, specifying parameters that describe how users react to content may include specifying a probability that a user's behavior will change with content exposure and a modification to the transition matrix based on exposure to a given content item. For example, an impressibility i∈[0,1] can indicate a probability that a user's behavior may change as the result of exposure to a content item. Impressibility parameters are discussed in further detail below in association with the content serving parameters 406 shown in FIG. 4D. In general, when a user is exposed to a content item, the user's downstream behavior may be impacted. A change in behavior can be represented by scaling (and renormalizing) one or more values in the activity transition matrix 400, for example. Modification to the activity transition matrix 400, for example, can be based on the activity transition matrix parameters 402 (shown in FIG. 4B).

Referring to FIG. 4B, for example, various activity transition matrix scaling parameters 402 are shown for modifying one or more activity preferences of a virtual user during a simulated session, after the presentation of a content item (e.g., an advertisement) to the user. In the present example, activity preference values for branded search (BS), generic search (GS), and visit to advertiser's website (VTA) activities can be modified, based on the injection of content items into the simulated session having search, display, or video formats. In some implementations, the short-term and long-term impacts of user exposure to a particular content format may be specified. For example, the activity transition matrix scaling parameters 402 include a set of long-term scaling parameters for search content that can have a persistent impact on the activity transition matrix 400, and a set of short-term parameters that can have a temporary impact. A persistent impact, for example, can indicate that scaling applied to the activity transition matrix 400 persists for all downstream activity. A temporary impact, for example, can indicate that the impact only exists until a transition to the next activity. For example, exposure to a search ad may increase the probability of a visit to the advertiser's website while the ad is visible.

The activity transition matrix scaling parameters 402, for example, can indicate an amount of scaling that is to be applied to the activity transition matrix 400 as a result of exposure of a content item. In the present example, the parameters h,j,k,l,z∈(1, ∞). After a search ad presentation, for example, the column BS of the activity transition matrix 400 is scaled by h, the column GS by one, and the column VTA by j. After scaling, for example, rows of the activity transition matrix 400 are renormalized to sum to one. In some implementations, column C (conversion) may be excluded from renormalization to preserve the rate at which conversions may be generated from visits to the content sponsor's website.

In some implementations, activity transition matrix scaling may be performed with one or more content impact scaling parameters that account for possible burn-in or fatigue that may be associated with exposure to content items (e.g., advertisements). Referring to FIG. 4C, for example, the content impact scaling parameters 404 include values of 0, x, and y, for the respective format types of search, display, and video, where x, y∈[1, ∞]. In general, an impact of a content item may increase over the first several impressions (burn-in) and may decline after additional impressions (fatigue). Display and video content item distribution may work this way, for example. If n represents a number of ads in a specified channel that have been served to a user, for example, the magnitude of scaling to the activity transition matrix 400 due to the $n^{th}$ ad exposure may be modified by multiplying the scaling by the hat function $f(n)$:

$$f(n)=1 \text{ if } n\_o=0$$

$$f(n)=n/n\_o \text{ if } 0<n<=n\_o$$

$$f(n)=2-n/n\_o \text{ if } n\_o<n<=2*n\_o$$

$$f(n)=0 \text{ if } n>2*n\_o$$

In the present example, the parameter n_o specifies an impression that is most impactful to a user's behavior (i.e., the impression after which burn-in ends and fatigue begins).

In some implementations, specifying parameters that regulate injection of content in a simulation may include specifying one or more of a probability that a content item is served in a respective channel of the campaign, a budget cap per channel, a minimum threshold for impressibility for each channel, or a cost of distributing content per channel. Referring to FIG. 4D, for example, the content serving parameters 406 include impressibility threshold parameters m, n, o∈[0, 1], share of voice parameters p, q, r∈[0,1], base cost parameters s,t,u∈[0, ∞], and cost scaling parameters for the respective format types of search, display, and video.

Impressibility threshold parameters can represent a minimum impressibility for presenting a content item, for example. For example, a virtual user that is associated with a higher search impressibility parameter may be more likely to search with a relevant keyword (than a virtual user that is associated with a lower search impressibility parameter), may be more likely to be presented with a content item (e.g., a search advertisement) that is provided in response to the keyword, and may be more likely to change behavior as a result of the presentation. In some implementations, impressibility threshold parameters may indicate an extent of an audience for content presentation. For search advertisements, for example, an audience may be determined by the size and/or relevance of a keyword set for presenting the ads. For display advertisements, for example, an audience may be determined by the size and/or relevance of a publisher website that presents the ads.

Share of voice parameters can represent a probability that an opportunity for serving a content item may be realized for a user that meets a minimum impressibility threshold, for example. In some implementations, share of voice parameters may be adjusted, based at least in part by one or more cost factors. For search advertisements, for example, the share of voice parameter p can be regulated by one or more keyword bids—higher bids, for example, may positively affect p.

In some implementations, a cost of presenting content (e.g., serving advertisements) may be determined, based on base cost parameters, cost scaling parameters, and share of voice parameters. A base cost parameter, for example, can represent a minimum cost of an advertising impression per click. A cost scaling parameter, for example, can be a binary parameter that indicates whether it may be more expensive to serve advertisements to users with lower impressibility. In some implementations, the cost of serving an ad may be represented by the formula:

$$\text{cost} = \text{base cost} * [1 + (\text{scaling indicator}) * (1-i) * 5] * \text{share of voice}$$

In some implementations, content serving parameters may include one or more frequency cap parameters. Referring to FIG. 4E, for example, the content frequency cap parameters 408 include frequency cap parameters ($\infty$, v, w) for the respective format types of search, display, and video, where v, w $\in [1, \infty]$. In the present example, content may not be served for a channel after a user has reached the frequency cap for that channel.

A first set of simulated activity streams is generated (504) with content distribution turned on, based on the specified parameters. For example, the content simulation system 210 can use the activity stream generator 212 to generate a set of activity streams 242 with advertising turned on for all channels (e.g., a channel for presenting search ads, a channel for presenting display ads, and a channel for presenting video ads) of a campaign, based on the activity transition matrix 400, the content serving parameters 406, and the content frequency parameters 408. Each of the activity streams in the set of activity streams 242, for example, can represent a simulated web session of an individual user, as the user transitions from activity to activity. To generate the set of activity streams 242 with all advertising channels turned on, for example, each ad channel's share of voice parameter from the content serving parameters 406 can be set to a non-zero value, to simulate an active campaign.

In some implementations, generating the first set of simulated activity streams may include for a first stream, identifying a starting point on the transition matrix that corresponds with an initial activity, traversing the transition matrix in accordance with defined probabilities, impressing content from the channels in accordance with a probability that a content item will be served in association with a respective activity, adjusting the transition matrix in accordance with the modification, and continuing to generate the first stream until an end of session activity is determined.

Figure 6:
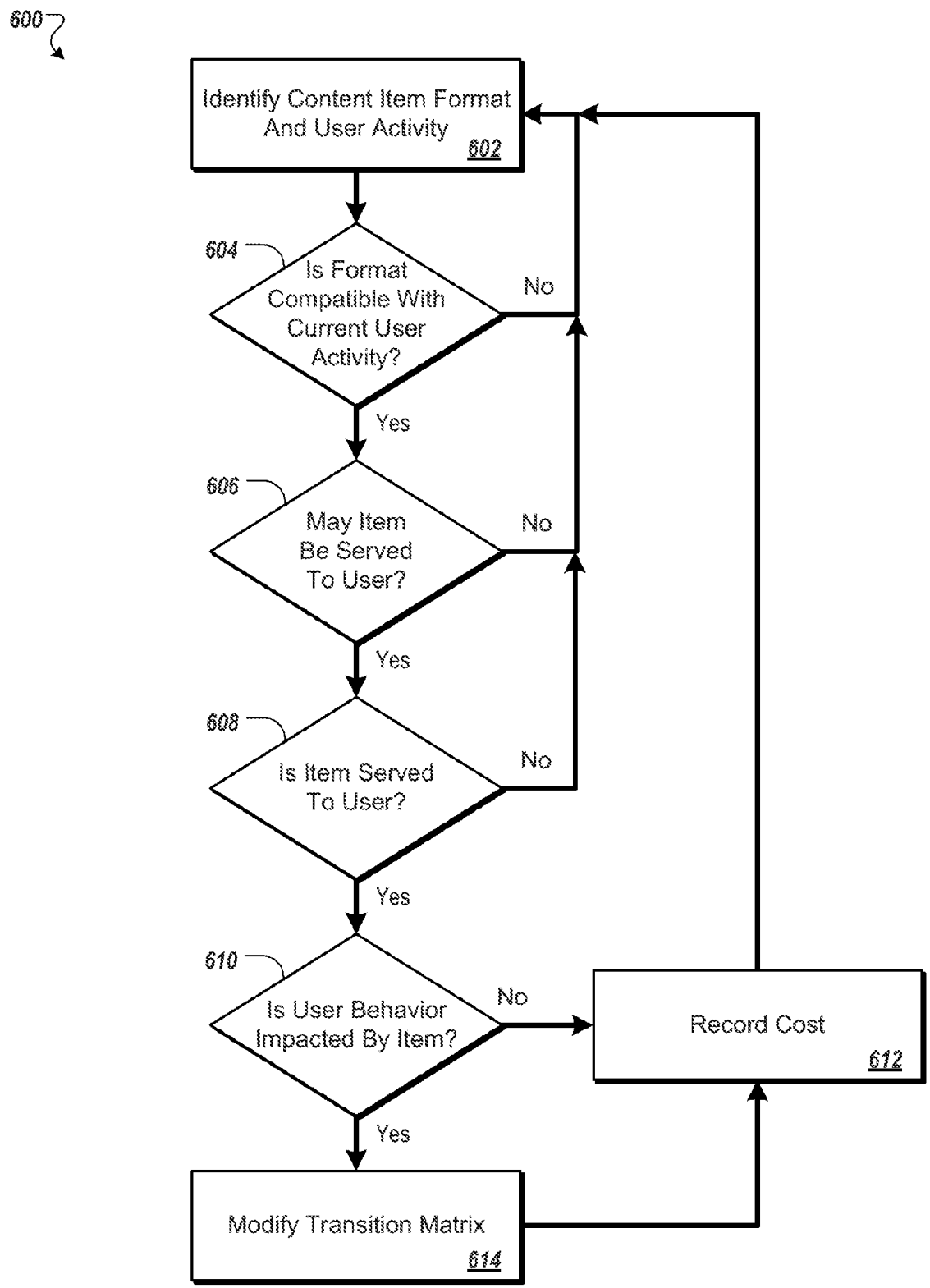
FIG. 6 is a flow chart illustrating an example process for serving content in simulated activity streams.

With respect to FIG. 6, an example process 600 is described for serving content items (e.g., advertisements) in simulated activity streams. A content item format and user activity is identified (602).

For a given content item format, for example, a determination (604) is made of whether the format is compatible with the user's current activity. Considering an activity stream in the set of activity streams 242, for example, a simulation for a corresponding virtual user may begin with a randomly assigned initial activity (e.g., a branded search, or BS). In general, search ads may be compatible with branded and generic searching, display ads may be compatible with visits to websites, and video ads may be compatible with video viewing. In the present example, a search ad is determined to be compatible with the user's current branded search activity.

A determination (606) is made of whether a content item may be served to a user. For example, based on the content serving parameters 406 and the content frequency parameters 408, the activity stream generator 212 can determine whether the user's impressibility meets an impressibility threshold for serving the content item, and whether the exposure frequency cap has been exceeded. In the present example, the user's impressibility meets the threshold, and a particular frequency cap is not identified for the search content item.

A determination (608) is made of whether the content item is served to the user during the user's current activity. For example, based on the share of voice parameter for the content item's format, and/or the cost of serving the content item, the activity stream generator 212 can determine whether the content item is to be served. In the present example, a search ad is served to the user during the user's current branded search activity.

A determination (610) is made of whether user behavior is impacted by the content item. For example, the user's impressibility probability can be used to determine whether the user is impacted. If the user is not impacted, for example, a cost of serving the content item (if applicable) can be recorded (612), and the next content item format and user activity can be identified (602). If the user is impacted, for example, an activity transition matrix can be modified (614), the cost can be recorded (if applicable) (612), and the next content item format and user activity can be identified (602). For a search advertisement, for example, a cost of presenting the ad may be applied if a simulation determines that a virtual user clicks the ad, and an impact on user behavior may include a click on the ad or an impact on downstream behavior. For a display advertisement, for example, a cost may be incurred if the ad is presented, independent of whether the presentation impacted user behavior. In the present example, when the user is impacted by the ad, the activity transition matrix 400 is modified based on the activity transition matrix scaling parameters 402. For the search ad, for example, the temporary scaling parameter z can be applied to the column BS and to the column VTA in the activity transition matrix 400. After applying the scaling factor, for example, the matrix rows can be renormalized, and a next activity can be randomly determined, based on the updated matrix probabilities. Continuing the present example, subsequent activities for the user's session may be determined to be a visit to the advertiser's website (VTA), followed by a conversion (C), followed by an end of session (EOS). When the end of session is reached, for example, no further activities are determined for the particular user's activity stream.

Referring again to FIG. 5, observational metrics associated with the first set of simulated activity streams are determined (506). In some implementations, determining observational metrics associated with the first set of simulated activity streams includes, for each type of distribution channel, determining one or more of impressions, clicks (e.g., for search ads), spend, reach, frequency, or share of voice. Other observational metrics may include, for example, conversion volume, conversion rates (e.g., at a user level), activity stream length, or activity fraction for each type of activity.

An attribution model is applied (508) to the generated first set of simulated activity streams and a first fraction of incremental conversions associated with one or more distribution channels is determined. For example, the campaign simulation system 210 can use the attribution model applicator 214 to apply one or more attribution models 250 to the set of activity streams 242. Attribution models applied by the system 210, for example, may include first click, last click, data-driven, last non-direct click, linear, time decay, position based, or other attribution models. In the present example, one or more of a last click attribution model 252, a first click attribution model 254, and/or a data-driven attribution model 256 can be applied to the activity streams 242.

In some implementations, applying the attribution model may include determining an estimate of a number of conversions associated with each distribution channel. For example, an estimate of a number of conversions attributed to a search ad channel, an estimate of a number of conversions attributed to a display ad channel, and an estimate of a number of conversions attributed to a video ad channel can be determined, based on each of the attribution models 252, 254, and 256. In some implementations, determining the first fraction of incremental conversions associated with one or more channels includes calculating an estimated fraction of incremental conversions for each of the channels. For example, based on the number of conversions attributed to each channel by the last click attribution model 252, estimated fractions 262 of incremental conversions can be determined, each estimated fraction associated with a different channel (e.g. a search ad channel, a display ad channel, and a video ad channel, respectively). Similarly, for example, estimated fractions 264 and 266 of incremental conversions can be determined for each of the respective attribution models 254 and 256, each estimated fraction associated with the search ad channel, the display ad channel, and the video ad channel, respectively.

One or more further sets of simulated activity streams are generated (510), for example, each with a single distribution channel turned off, based on the specified parameters. Similar to step (504), for example, the content simulation system 210 can use the activity stream generator 212 to generate a set of activity streams 244 with content turned off for one of the channels (e.g., the channel for presenting search ads, the channel for presenting display ads, or the channel for presenting video ads) of a campaign, based on the activity transition matrix 400, the content serving parameters 406, and the content frequency parameters 408. To generate the set of activity streams 244 with a particular channel turned off, for example, the channel's share of voice parameter from the content serving parameters 406 can be set to zero. Similar to step (504), for example, generating one or more further sets of simulated activity streams can include, for a first stream, identifying a starting point on the activity transition matrix 400 that corresponds with an initial activity, traversing the transition matrix in accordance with defined probabilities, and continuing to generate the first stream until an end of session activity is determined.

In some implementations, one or more of the further sets of simulated activity streams may have multiple distribution channels turned off, based on the specified parameters. For example, by turning off all advertising channels of a campaign, the results of a simulation can be used to generate baseline metrics for determining an effectiveness of the entire campaign. As another example, two or more channels may be turned off in combination as part of a virtual experiment to determine an impact that different channels may have on each other during a campaign.

Observational metrics associated with the one or more further sets of simulated activity streams are determined (512). Similar to step (506), for example, determining observational metrics associated with the one or more further sets of simulated activity streams (e.g., the activity streams 244) can include, for each type of distribution channel, determining one or more of impressions, clicks, or share.

A second fraction of incremental conversions is determined (514) for each distribution channel by evaluating the further set of simulated activity streams with the single distribution channel turned off. In some implementations, determining the second fraction of incremental conversions for each channel may include determining a number of incremental conversions for the single channel, repeating the generating and determining for each channel, and calculating a total number of incremental conversions for each channel. The second fraction of incremental conversions for each channel can be based on a respective number of incremental conversions for a given channel divided by the total number of incremental conversions. For example, the campaign simulation system 210 can use the activity stream evaluator 216 to evaluate activity streams 244 that have the channel for presenting search ads turned off and can subtract the number from a total conversion volume associated with all advertising channels being turned on (e.g., as determined in step (506)) to determine a number of incremental conversions for the search ad channel. Similarly, the activity stream generator 212 and activity stream evaluator 216 can determine a respective number of incremental conversions for each of the display ad and video ad channels. By dividing the number incremental conversions for a particular channel by the total number of incremental conversions, for example, a set of second fractions of incremental conversions 268 can be determined for the search ad, display ad, and video ad channels, respectively.

The first and second fractions of incremental conversions are compared (516), such as to determine the applicability of the attribution model. For example, the campaign simulation system 210 can use the report generator 218 to generate a comparison report 270 that compares the second fraction of incremental conversions for a particular channel (e.g., the search advertising channel) with the first fraction of incremental conversions for the channel as estimated by an attribution model (e.g., the last click attribution model 252). In some implementations, the method 500 may be repeated for a second attribution model and results may be compared for each attribution model to determine a most effective attribution model. In the present example, the comparison report 270 includes a comparison between the second fraction of incremental conversions for the search channel with the first fraction of incremental conversions for the search channel as estimated by each of the attribution models 252, 254, and 256, respectively. The comparison report 270, for example, can be provided to the client device 202 of the content sponsor 202, to assist the content sponsor in the selection of (or creation of) a suitable attribution model for a particular type of campaign or distribution channel.

In some implementations, the parameters may be varied and the method 500 may be repeated to evaluate the attribution model in view of the varied parameters. For example, the campaign simulation system 210 and/or the content sponsor 204 can vary one or more values in the activity transition matrix 400, and/or one or more of the activity transition matrix scaling parameters 402, the content impact scaling parameters 404, the content serving parameters 406, or the content frequency cap parameters 408. By varying the parameters, for example, the conditions of a virtual experiment can be changed and attribution models can be compared under the different conditions.

In some implementations, total spend may be used as a budget, and an optimal mix of spend can be determined (518) across all distribution channels that generates a most incremental conversions using the budget. The optimal mix can be determined, for example, by trial and error, or by using a standard optimization technique. Observational metrics can be generated in association with the optimal mix, a fraction of incremental spend can be assigned to each channel, and applicability of the attribution model can be determined by comparing the fraction of incremental spend with the first fraction of incremental conversions. The method may be repeated for a second attribution model and results for each attribution model may be compared to determine a most effective attribution model. The parameters may be varied and the method may be repeated to evaluate the attribution model in view of the varied parameters.

Figure 7:
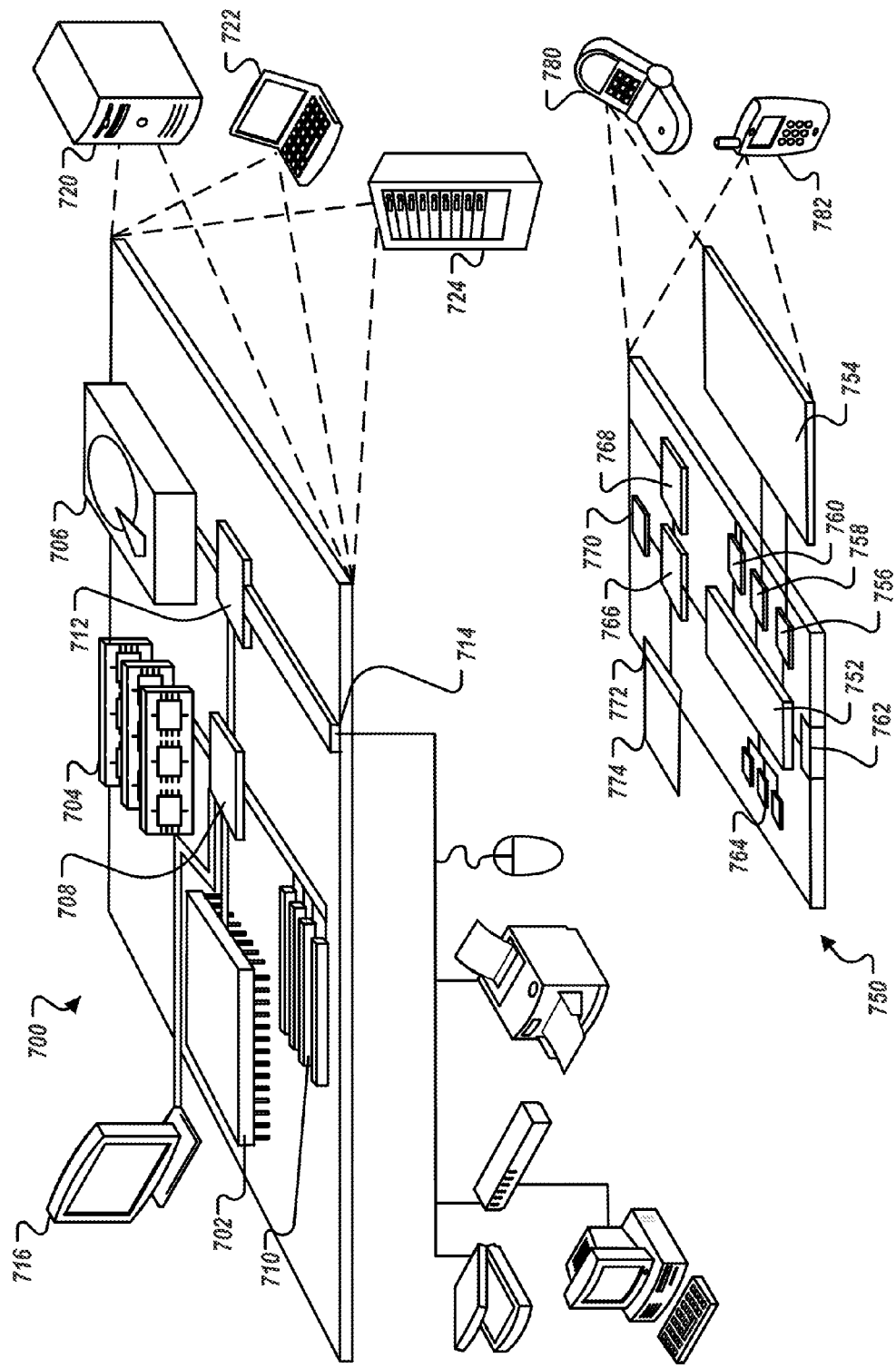
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 may process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth™, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 may execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 may be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used here, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   specifying parameters that describe how users behave in an absence of advertising, parameters that describe how users react to advertising, and parameters that regulate injection of advertising in a simulation, wherein specifying parameters that describe how users behave in an absence of advertising includes at least one of specifying an activity level that influences a length of a simulated activity stream, an activity preference from among a plurality of possible activities, and a conversion rate for a given activity, wherein specifying parameters that describe how users react to advertising includes specifying a probability that a user's behavior will change with advertising exposure, wherein the simulation is conducted using the specified parameters to generate a plurality of simulated activity streams, each simulated activity stream representing a sequence of simulated online actions performed by a virtual user during a simulated web session;

generating, by one or more processors, a first set of simulated activity streams with advertising turned on, based on the specified parameters;

determining observational metrics associated with the first set of simulated activity streams;

applying an attribution model to the generated first set of simulated activity streams and determining a first fraction of incremental conversions associated with one or more advertising channels;

generating, by one or more processors, one or more further sets of simulated activity streams, each with a single advertising channel turned off, based on the specified parameters;

determining observational metrics associated with the one or more further sets of simulated activity streams;

determining a second fraction of incremental conversions for each advertising channel by evaluating the further set of simulated activity streams with the single advertising channel turned off; and comparing the first and second fractions of incremental conversions to determine an applicability of the attribution model for estimating effectiveness of a campaign, wherein the comparing comprises generating a comparison report that includes information related to the first and second fractions and providing the comparison report for presentation at a client device.

2. The method of claim 1, wherein the simulation is conducted to generate a different simulated activity stream for each virtual user of a heterogeneous set of virtual users, wherein the activity level that influences the length of the simulated activity stream represents a volume of user activity for a given virtual user over a predetermined time interval, and wherein the activity preference specifies a frequency of a particular activity for the given virtual user.

3. The method of claim 2, wherein specifying parameters that describe how users behave in an absence of advertising includes generating a transition matrix that includes columns and rows that represent activities and corresponding entries in the transition matrix that define a probability of progressing from a given activity to a corresponding next activity.

4. The method of claim 3, wherein specifying parameters that describe how users react to advertising includes a modification to the transition matrix based on exposure to a given advertisement.

5. The method of claim 4, wherein specifying parameters that regulate injection of advertising in a simulation includes specifying one or more of a probability that an advertisement is served in a respective channel of the campaign, a budget cap per channel, a minimum threshold for impressibility for each channel, or a cost of advertising per channel.

6. The method of claim 5, wherein generating the first set of simulated activity streams includes for a first stream, identifying a starting point on the transition matrix that corresponds with an initial activity, traversing the transition matrix in accordance with defined probabilities, impressing advertising from the channels in accordance with a probability that an advertisement will be served in association with a respective activity, adjusting the transition matrix in accordance with the modification, and continuing to generate the first stream until an end of session activity is determined.

7. The method of claim 6, wherein determining observational metrics associated with the first set of simulated activity streams includes, for each type of advertising channel, determining one or more of impressions, clicks, spend, reach, frequency, or share.

8. The method of claim 1, wherein applying the attribution model includes determining an estimate of a number of conversions associated with each advertising channel.

9. The method of claim 1, wherein determining the first fraction of incremental conversions associated with one or more advertising channels includes calculating an estimated fraction of incremental conversions for each of the channels.

10. The method of claim 3, wherein generating the one or more further sets of simulated activity streams includes, for a first stream, identifying a starting point on the transition matrix that corresponds with an initial activity, traversing the transition matrix in accordance with defined probabilities, and continuing to generate the first stream until an end of session activity is determined.

11. The method of claim 10, wherein determining observational metrics associated with the one or more further sets of simulated activity streams includes, for each type of advertising channel, determining one or more of impressions, clicks, or share.

12. The method of claim 1, wherein determining the second fraction of incremental conversions for each advertising channel comprises:

determining a number of incremental conversions for the single advertising channel;

repeating the generating and determining for each advertising channel;

calculating a total number of incremental conversions for each advertising channel; and determining the second fraction of incremental conversions for each advertising channel based on a respective number of incremental conversions for a given channel divided by the total number of incremental conversions.

13. The method of claim 1, further comprising repeating the method for a second attribution model and comparing results for each attribution model to determine a most suitable attribution model for estimating effectiveness of the campaign.

14. The method of claim 1, further comprising varying the parameters and repeating the method to evaluate the attribution model in view of the varied parameters.

15. The method of claim 1, further comprising using total spend as a budget, determining an optimal mix of spend across all advertising channels that generates a most incremental conversions using the budget, generating observational metrics in association with the optimal mix, finding a fraction of incremental spend to assign to each channel, and determining applicability of the attribution model including comparing the fraction of incremental spend with the first fraction of incremental conversions.

16. The method of claim 15, further comprising repeating the method for a second attribution model and comparing results for each attribution model to determine a most suitable attribution model for estimating effectiveness of the campaign.

17. The method of claim 15, further comprising varying the parameters and repeating the method to evaluate the attribution model in view of the varied parameters.

18. The method of claim 1, wherein one or more of the further sets of simulated activity streams has multiple advertising channels turned off, based on the specified parameters.

19. A computer program product embodied in a non-transitive computer-readable medium including instructions, that when executed, cause one or more processors to perform operations comprising:
- specifying parameters that describe how users behave in an absence of advertising, parameters that describe how users react to advertising, and parameters that regulate injection of advertising in a simulation, wherein specifying parameters that describe how users behave in an absence of advertising includes at least one of specifying an activity level that influences a length of a simulated activity stream, an activity preference from among a plurality of possible activities, and a conversion rate for a given activity, wherein specifying parameters that describe how users react to advertising includes specifying a probability that a user's behavior will change with advertising exposure, wherein the simulation is conducted using the specified parameters to generate a plurality of simulated activity streams, each simulated activity stream representing a sequence of simulated online actions performed by a virtual user during a simulated web session;
- generating, by one or more processors, a first set of simulated activity streams with advertising turned on, based on the specified parameters;
- determining observational metrics associated with the first set of simulated activity streams;
- applying an attribution model to the generated first set of simulated activity streams and determining a first fraction of incremental conversions associated with one or more advertising channels;
- generating, by one or more processors, one or more further sets of simulated activity streams, each with a single advertising channel turned off, based on the specified parameters;
- determining observational metrics associated with the one or more further sets of simulated activity streams;
- determining a second fraction of incremental conversions for each advertising channel by evaluating the further set of simulated activity streams with the single advertising channel turned off; and
- comparing the first and second fractions of incremental conversions to determine an applicability of the attribution model for estimating effectiveness of a campaign, wherein the comparing comprises generating a comparison report that includes information related to the first and second fractions and providing the comparison report for presentation at a client device.

20. A system comprising:
- one or more processors; and
- one or more memory elements including instructions, that, when executed, cause the one or more processors to perform operations comprising:
- specifying parameters that describe how users behave in an absence of advertising, parameters that describe how users react to advertising, and parameters that regulate injection of advertising in a simulation, wherein specifying parameters that describe how users behave in an absence of advertising includes at least one of specifying an activity level that influences a length of a simulated activity stream, an activity preference from among a plurality of possible activities, and a conversion rate for a given activity, wherein specifying parameters that describe how users react to advertising includes specifying a probability that a user's behavior will change with advertising exposure, wherein the simulation is conducted to generate a plurality of simulated activity streams, each simulated activity stream representing a sequence of simulated online actions performed by a virtual user during a simulated web session;
- generating, by one or more processors, a first set of simulated activity streams with advertising turned on, based on the specified parameters;
- determining observational metrics associated with the first set of simulated activity streams;
- applying an attribution model to the generated first set of simulated activity streams and determining a first fraction of incremental conversions associated with one or more advertising channels;
- generating, by one or more processors, one or more further sets of simulated activity streams, each with a single advertising channel turned off, based on the specified parameters;
- determining observational metrics associated with the one or more further sets of simulated activity streams;
- determining a second fraction of incremental conversions for each advertising channel by evaluating the further set of simulated activity streams with the single advertising channel turned off; and
- comparing the first and second fractions of incremental conversions to determine an applicability of the attribution model for estimating effectiveness of a campaign, wherein the comparing comprises generating a comparison report that includes information related to the first and second fractions and providing the comparison report for presentation at a client device.

* * * * *